June 10, 1958     E. J. BLIGARD     2,838,700
FLEXURE LINKS FOR A VIBRATING COIL SUPPORT
Filed Feb. 2, 1953     5 Sheets-Sheet 1

Inventor
Erling J. Bligard
By his attorneys
Howson and Howson

June 10, 1958 E. J. BLIGARD 2,838,700
FLEXURE LINKS FOR A VIBRATING COIL SUPPORT
Filed Feb. 2, 1953 5 Sheets-Sheet 2

Inventor
Erling J. Bligard
By his attorneys
Howson and Howson

June 10, 1958 E. J. BLIGARD 2,838,700
FLEXURE LINKS FOR A VIBRATING COIL SUPPORT
Filed Feb. 2, 1953 5 Sheets-Sheet 3

*Inventor*
*Erling J. Bligard*
By his attorneys
Howson and Howson

June 10, 1958  E. J. BLIGARD  2,838,700
FLEXURE LINKS FOR A VIBRATING COIL SUPPORT
Filed Feb. 2, 1953  5 Sheets-Sheet 4

Inventor
Erling J. Bligard
By his attorneys
Howson and Howson

United States Patent Office 2,838,700
Patented June 10, 1958

2,838,700

FLEXURE LINKS FOR A VIBRATING COIL SUPPORT

Erling J. Bligard, East Haven, Conn., assignor, by mesne assignments, to Textron, Inc., Providence, R. I., a corporation of Rhode Island Application February 2, 1953, Serial No. 334,438

27 Claims. (Cl. 310—27)

This invention relates to flexible mountings or flexure links.

In many machines and mechanical devices it has been found that one element must be elastically linked to a support in such fashion that relative motion of this element with respect to its support is possible to and fro substantially rectilinearly, and motion in any other direction is prevented. One art in which such requirement is of prime importance, is the art pertaining to vibration exciters and calibrators. These are machines designed to transmit vibrations of easily controlled characteristics to a table where the effects of such vibrations on various objects can be studied. Generally, the construction of such vibrators calls for attaching the table to an electromagnetic driving means in the form of a coil. This coil, the table, and means for attaching the coil to the table, make up the moving element of the vibration exciter or calibrator. In the normal cycle of operations, the coil is reacted on by alternating electromagnetic forces. These forces usually result in a vibratory displacement of the coil and a like displacement of the table to which it is attached. Since it is of the utmost importance to control the character of the movement of the table within precise limits, it is advantageous that no extraneous motion be introduced by the suspension means which elastically hold the moving element. It is also essential that the suspension means control the motion of the table in such a way that objectionable outside forces and couples are reacted to by forces and couples in the suspension means rather than by extraneous acceleration of the table. By extraneous acceleration is meant undesirable acceleration not perpendicular to the plane of the table.

Suspensions hitherto constructed have generally imparted a slightly arcuate movement to the table resulting in an impure vibration and a less efficient machine. In addition, although previous suspensions have attempted to take advantage of the well-known high energy storage characteristics of several forms of cantilever beams, these attempts have not been completely successful because of the requirement that one end of the beam be free of any bending moments. In those previous constructions which have been able to free one end of a cantilever beam of bending moments other factors have been introduced which have made the assembly as a whole short of what might be desired. In these latter structures often no compensation is made for the foreshortening of the beam on bending. Moreover, forces directed along the length of the beam as a result of the enforced arcuate motion or forces in this direction resulting from reactions of specimens mounted on the table, are often carried by thin bands used to free the end of the beam from bending moments. These relatively large forces on the thin bands have resulted in costly service problems.

It has now been found that flexure links can be constructed which will insure linear rather than arcuate motion of the table, and which when a cantilever beam construction is desired, permit the construction of a suspension using the optimum energy storage potential of the material in a practical configuration. Flexure links according to the invention provide compensation for cantilever beam foreshortening caused by bending and sustain forces directed along the length of the beam due to reactions from table mounted specimens by means which prevent damaging stresses in the various component parts.

By permitting the optimum energy storage potential of the flexure material to be utilized, the novel flexure links can be made relatively light in weight, permitting the table to reach higher vibration frequencies without flexure resonance and providing a suspension which will support heavier loads with less undesirable static deflection. Both advantages can be obtained without overstressing the links.

A further reduction in weight of the moving element and therefore a further increase in the efficiency of the apparatus may be obtained because of the reduction of bending moment induced in the moving element by the novel links.

Flexure links according to the invention comprise a beam and rocker means attached to at least one end of the beam. The rocker means contact either the moving element or the stationary element or both, and act as a hinge to allow the table to move linearly perpendicular to its plane, while at the same time preventing the table from moving parallel to its plane. In addition, the hinged construction of the novel flexure links permits the fullest exploitation of the advantages resulting from the cantilever beam construction, when such construction is desired.

Although this specification will describe only the application of the invention in a vibration exciter, it is to be understood that the novel device is not limited to such an embodiment, but may be employed in all those arts and manufactures where its unique mode of operation would be of particular importance.

Figures 1, 3, 4, 12, 13, 14, 16:
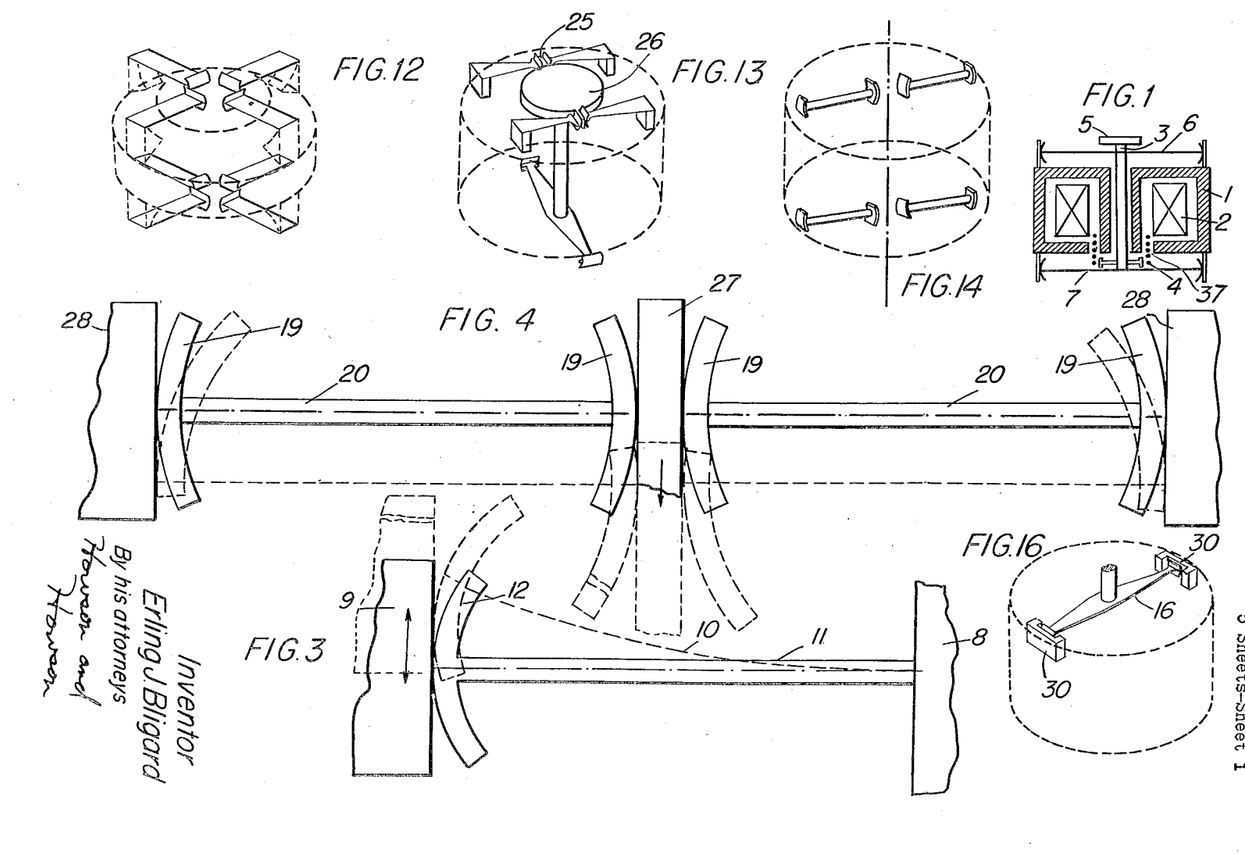
Figure 1 is a schematic view in vertical section through a typical vibration exciter employing my novel flexure link.
Figure 3 is a detailed schematic view illustrating the operation of the simplest type of the novel flexure link.
Figure 4 is a detailed schematic view showing the operation of another type of the invention in which there are a pair of links with rockers at both ends of each link, and in which the links are stiff.
Figure 12 is a schematic perspective view showing four flexure links at each end of the moving element.
Figure 13 is a schematic perspective view showing a way in which the flexure link of Figs. 7 and 8 may be used in cooperation with four of the flexure links of Figs. 5 and 6 arranged in a different manner from Fig. 12.
Figure 14 is a schematic perspective view showing the type of flexure links of Fig. 4 in a vibration exciter.
Figure 16 is a schematic perspective view showing how the type of flexure link illustrated in Figs. 7 and 8 may be used to provide, in a single plane, the support necessary for the moving elements of a vibration exciter.
Figure 2:
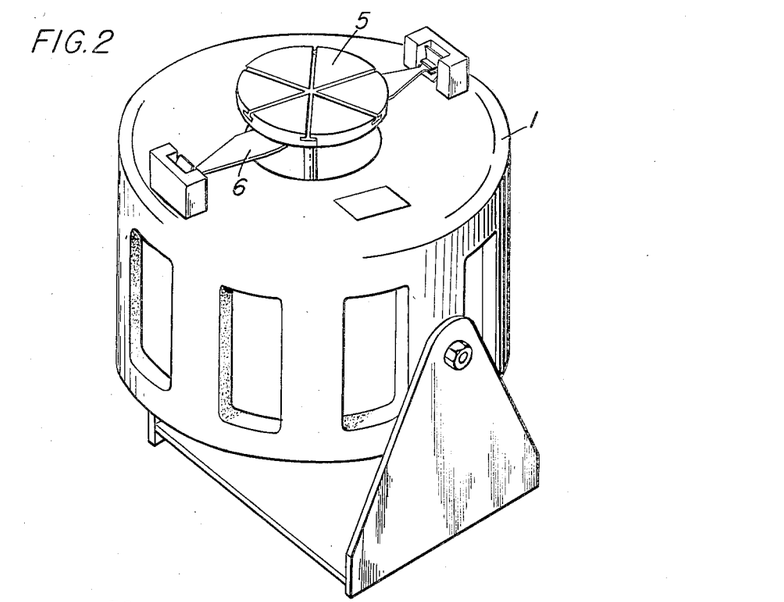
Figure 2 is a perspective view of an exciter such as shown in Fig. 1.

To understand the situation in which the novel flexure link is used to an advantage, reference is had to Figs. 1 and 2 which show a typical vibration exciter employing the novel flexure links. An electro-magnetic vibration exciter consists essentially of a large iron core 1, containing a field coil 2. A driving coil 4 is placed in an air gap 37 of core 1, where the magnetic flux density is very high. When the field coil 2 is energized and an alternating current is passed through the driving coil 4, forces are developed tending to move the driver coil axially with a frequency dependent on the frequency of the alternating current in the driver coil. To utilize these forces, an axial drive rod 3 is customarily fastened to the driver coil 4, connecting it to a table 5 where objects to be submitted to vibration are placed. It will be appreciated it is of the utmost importance that the vibrations transmitted through the table 5 should be free of any motion transverse to the direction of generated force. To support and control the moving element which consists of the table 5, any objects which may be placed thereon, the driver coil 4 and the drive rod 3, flexure links 6 and 7, which are the subject of the present invention are employed.

The invention may be said to have two principal types, one in which the flexure link undergoes bending, and the other in which the link is rigid. Each of these types may have any of several specific embodiments when applied to particular devices.

The operation of the two principal types of the invention is shown in Figs. 3 and 4. It will be understood that Figs. 3 and 4 are merely schematic diagrams, and od not illustrate detailed structure.

The operation of the simpler type is shown in Fig. 3. As illustrated in that figure, the novel flexure link comprises a resilient flexible beam 11, and a curved rocker 12. Figure 3 shows the flexure link connecting a member 8 to another member 9, moving relative to member 8. The beam 11, is fixed to member 8, and the rocker is rockably attached to the member 9, so that as the beam bends, the rocker 12 will not slide relative to member 9. Means by which this attachment is accomplished will be explained in detail below.

Assuming that member 9 is given an upward motion in relation to member 8, the flexure link will move to a position shown in somewhat exaggerated form by the dotted lines. The rocker 12, in effect, rolls on the surface of member 9, so that the beam 11, is allowed to bend without restraint at the rocker end while at the same time the rocker 12 by properly designed curvative as hereinafter described compensates for the shortening of the beam laterally due to bending, and the effective length of the flexure as a whole is not altered. The rocker is always in contact with member 9. When a plurality of flexure links of the type shown in Fig. 3 are employed in balanced relation and in hereinafter-described arrangements around the moving element, a suspension is furnished which will prevent lateral movement of the moving element.

The second general type of flexure link is illustrated in Fig. 4. As shown there, each link comprises a rigid beam 20, having two rockers 19, one at each end. The rockers 19 may be rockably and non-slidably connected or semi-fixed to the moving element 27 and stationary element 28.

As the moving element 27 moves, the flexure links rotate and translate with the rockers rolling and maintaining the same distance between the moving element and stationary element. It will be noted that with the type of the invention shown in Fig. 4, there is no bending of the beam 20. This is desirable in certain cases.

As was the case with the links of Fig. 3, when a plurality of flexure links of the type shown in Fig. 4 are arranged in balanced relation around the moving element, the moving element is allowed linear motion along an axis perpendicular to the plane of the links. Since the rockers are always in contact with their appropriate members, the moving element is prevented from moving transversely to that axis.

In the embodiments of the invention patterned after Fig. 3, the exact shape of the rocker will vary depending on the construction of the beam and the surface upon which the rocker has contact. If the beam is such that it will bend in the arc of a circle when a load without moment is placed at one end, and the contact surface is a plane perpendicular to the unstressed axis of the beam, then the rocker may be given a curvature corresponding to the arc of a circle having a radius approximately one-third the length of the flexure link.

When the flxeure link is of the rigid type shown in Fig. 4 with the rocker contact surfaces parallel planes, the rocker curvature will be the arc of a circle having a radius one-half the length of the rigid links. The link will act like a wheel as it rolls on the surfaces of the fixed and moving elements.

Figure 5:
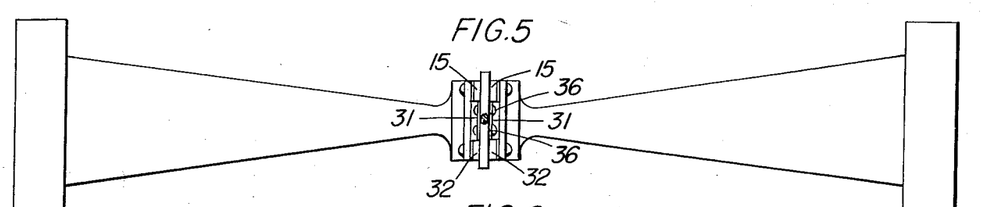
Figure 5 is a detailed plan view of one embodiment of the type of flexure link shown in Fig. 3 as mounted in an exciter.
Figures 6, 9, 10, 11, 15:
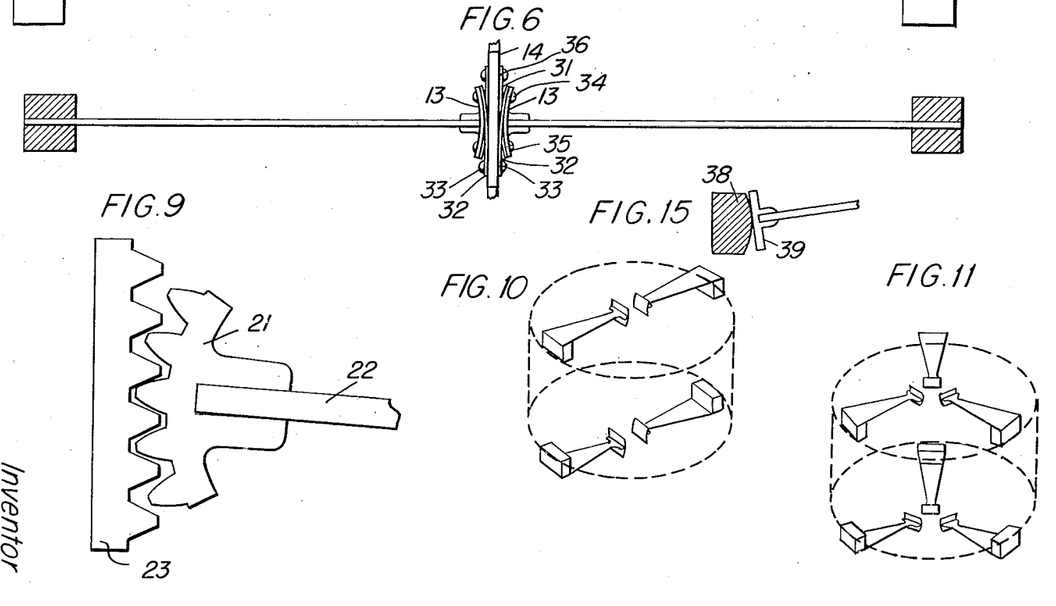
Figure 6 is a view in elevation and partly in vertical section of the flexure link of Fig. 5.
Figure 9 is a detailed view in elevation showing details of a rack and pinion form of rocker which may be used in the novel flexure links.
Figure 10 is a schematic perspective view showing one way in which the embodiment shown in Figs. 5 and 6 may be mounted in a vibration exciter.
Figure 11 is a schematic perspective view showing a way in which three flexure links of the type shown in Figs. 5 and 6, may be mounted at each end of the moving element.
Figure 15 is a detailed schematic view illustrating an embodiment wherein a flat rocker rolls on a curved surface.

Details of one embodiment of flexure link made according to the type of invention in Fig. 3, are illustrated in Figs. 5 and 6. As shown there, the rockers 13 are mounted on the movable ends of the flattened resilient cantilever portions of the flexures and may be attached to the moving element 14, by means of three support bands 15, 31, and 32 which are attached to each rocker. Each support band is simply a resilient flexible strip of metal, one end of which is attached to the surface of the moving element facing the rocker, the other end being attached to the surface of the rocker facing the moving element. If the point of attachment of one end of a strip to the rocker is above the plane of the beam then the point of attachment of the other end of that strip to the moving element will be below the plane of the beam; or vice versa. Band 31, located in the center of the rocker is approximately twice as wide as outer bands 15 and 32. One end of center band 31 is attached to the contact surface on the moving element adjacent one side of the rocker as at 36 while the other end of that band is attached to the other side of the rocker as at 35. The outer bands 15 and 32, are arranged with one end attached as at 34 to that side of the rocker opposite to the side to which the center band is attached. The other ends of outer bands 15 and 32 are attached to the contact surface of the moving element as at 33. Thus rockers 13, are semi-fixed with relation to the moving element 14, in that they will roll evenly with linear movement of the moving element, but will not slide. It will be recognized that the number of support bands used on the rockers is a matter of choice.

Although only two flexure links in one horizontal plane appear in Figs. 5 and 6, it may be desirable to have the moving element supported in more than one plane. Such arrangements of flexure links in more than one plane are discussed further below.

Figure 7:
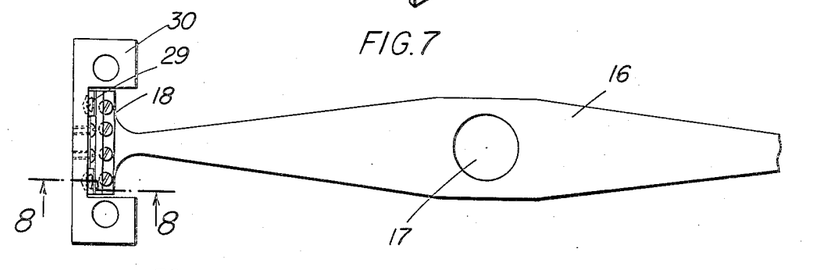
Figure 7 is a plan view of part of another arrangement of beam and rocker of the general type shown in Fig. 3.
Figure 8:
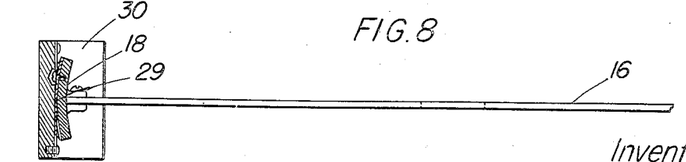
Figure 8 is a view partly in elevation and partly in vertical section along the line 8—8 of Fig. 7.

Another arrangement of beam and rocker is shown in Figs. 7 and 8. The general type of the invention illustrated in these figures is again that illustrated in Fig. 3 in that the beam will bend. In the embodiment shown in Figs. 7 and 8, the flexure link consists of a single beam 16, bored to receive a central attachment of the moving element 17, and fitted with a rocker 18, at each end. Thus a single link supports the moving element on two sides and only one link in one plane of support is needed to give balanced support (see Figs. 2 and 16). The rockers have support bands 29 which may be attached to brackets 30 in a manner generally similar to that described in connection with Figures 5 and 6, thus to provide contact surfaces on both sides of the exciter core.

Instead of employing the support bands illustrated in Figs. 5, 6, 7, and 8 [or in Figs. 17–23 described below] a rack and pinion construction can be used. Such an arrangement is illustrated in Fig. 9, where a pinion rocker 21 is attached to a beam 22. A rack 23 is attached as a contact surface either to the moving element, to the stationary element, or to both, according to the type of link used.

The curvature of the rocker is not fixed by the bending shape of the beam alone, but is also determined by the shape of the contact surface 38. Thus, as shown in Fig. 15, a rocker 39 may be flat while its contact surface 38 may be curved.

Figure 17:
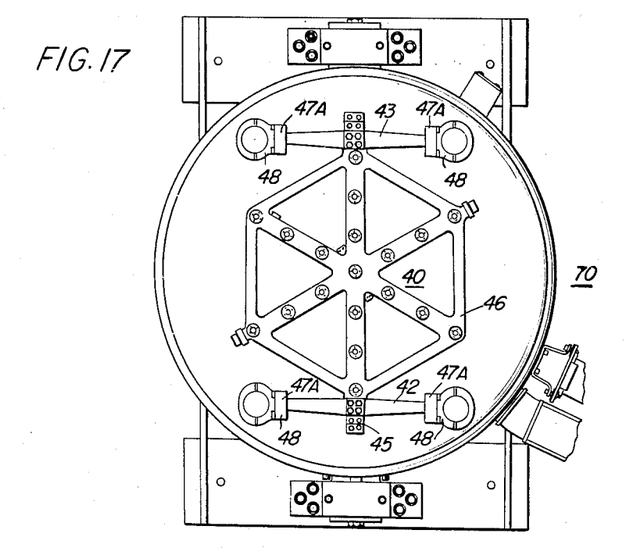
Figure 17 is a plan view of a form of vibration exciter modified with respect to that shown in Fig. 1, in that the table and the exciter coil are on the same side of the field coil, and employing a preferred arrangement of flexure links and a preferred rocker assembly construction.
Figures 18, 21, 22:
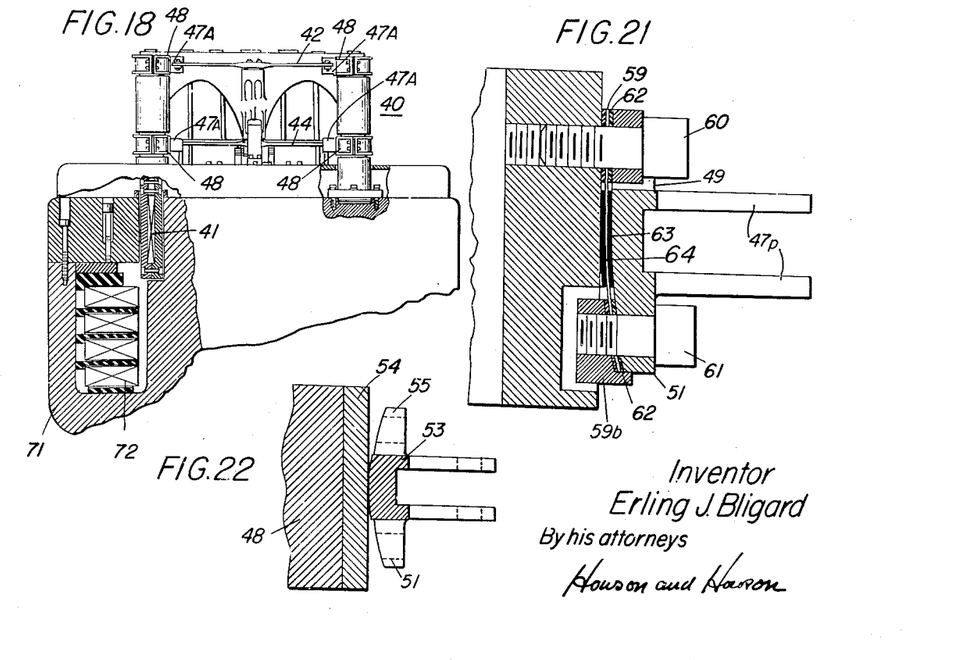
Figure 18 is a side elevational view, partly in section showing further the manner of mounting the flexure links in the vibration exciter of Fig. 17.
Figure 21 is a cross sectional view along the line 21—21 of Fig. 19 showing details of an intermediate section of the rocker assembly.
Figure 22 is a cross sectional view along the line 22—22 of Fig. 19 showing details of an outer section of the rocker assembly.

Many arrangements of the flexure links previously discussed are possible in the construction of vibration exciters. A preferred arrangement is shown in Figs. 17–23. As shown in those figures, a vibration exciter 70 has a core 71, a field coil 72, and a moving element indicated generally as 40, and including an exciter or driver coil 41. The moving element 40 is suspended in two parallel planes by means of four flexure links, upper links 42, 43, and lower links 44 being visible in Figures 17 and 18. It will be noted that the links of Figs. 17 and 18 are of a type similar to that illustrated in Figs. 7 and 8, in that rocker means are mounted on each end of a beam and the beam is attached at its center to the moving element. In general this is the preferred form of link. As shown in Figs. 17 and 18, the links are rigidly attached at their centers to projections 45 on a spider 46, which is part of the moving element 40. The ends of the links have rocker assemblies 47 which are in rolling contact with brackets 48, mounted on the exciter 70.

Details of the rocker used in the preferred assembly of Figs. 17 and 18 are shown in Figs. 19–26.

The rocker assembly is made up of a rocker element 47 (illustrated individually in Fig. 25) and a central and two outer supporting bands 55 and 59 (illustrated individually in Figs. 24 and 25) by which the rocker is rockably and non-slidably attached to the support bracket 48 of the exciter by bolts and fittings, as will now be described.

Figures 19, 20, 23, 24, 25, 26:
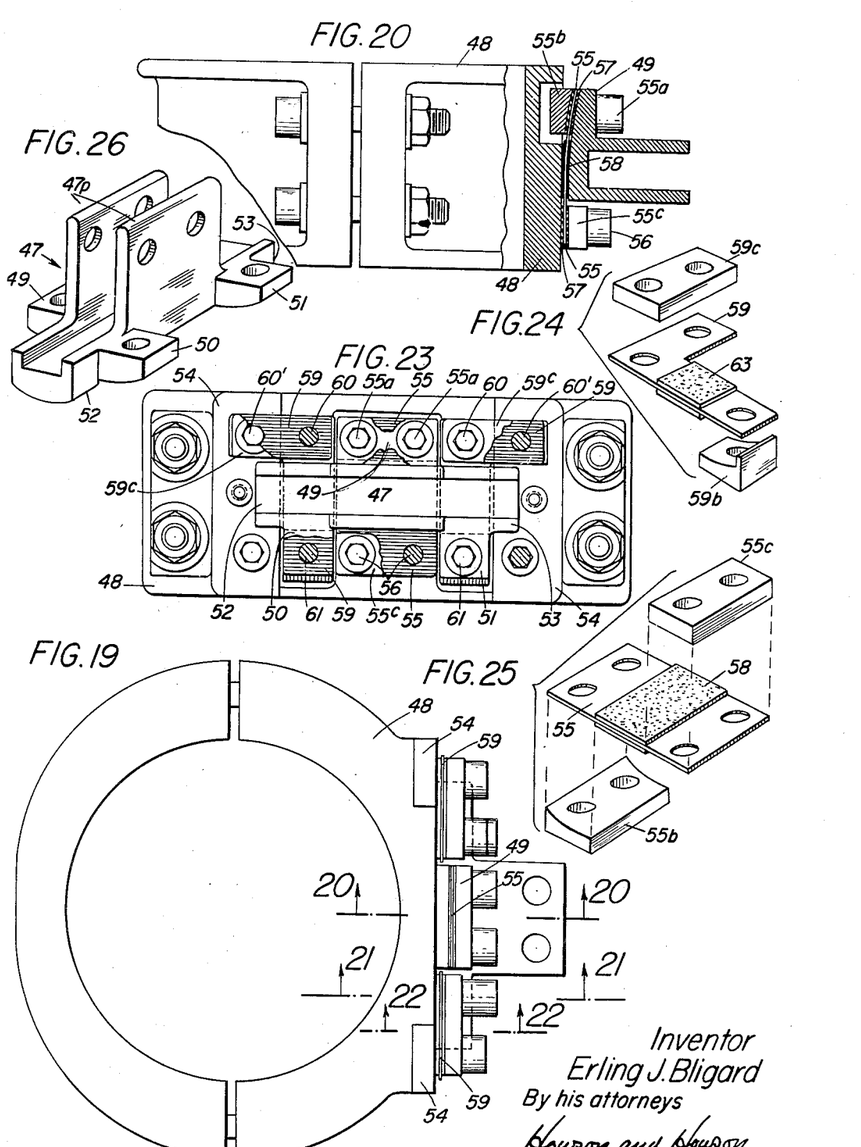
Figure 19 is a plan view showing in detail the rocker assembly used in the exciter of Fig. 17.
Figure 20 is a side elevation view, partly in section along the line 20—20 of Fig. 19 to show details of a center section of the rocker assembly.
Figure 23 is a right side elevational view of the rocker assembly as seen in Figs. 19 and 20.
Figures 24 and 25 are exploded perspective views of the end and central supporting bands and associated elements employed in the rocker assembly.
Figure 26 is a perspective view of the rocker element employed in the form of Figures 17–23.

The rocker element is formed with a mid-arm 49 extending laterally from one side at its mid-section and two arms 50, 51 extending laterally from the other side near its ends, the mid-arm being about twice as wide as either opposite arm.

The rocker assembly may be considered as possessing five sections side-by-side. The central section may be considered as extending the width of the mid-arm 49 of the rocker element; intermediate sections extending the widths of the arms 50 and 51; and the end sections 52 and 53 extending from the arms 50 and 51, respectively, to the ends of the rocker element.

For mounting the rocker on the beam parallel plate members 47p extend from one face and are bored for securing bolts.

The opposite face of the rocker element is arcuate to provide the desired rolling contact with the bracket 48. Rolling contact is confined entirely to the outer sections 52 and 53 for which purpose the arcuate surfaces of the intermediate and central sections are offset or recessed inwardly by being curved on a smaller radius than the bearing surfaces of the outer sections (see Figs. 22 and 25).

Hardened steel wear plates 54 are attached to bracket 48 and contact sections 52 and 53, thus minimizing wear. Although hardened steel has been found satisfactory for wear plates 54, it will be obvious to those skilled in the art that other wear-resistant materials may be employed.

For the purpose of ensuring rolling non-sliding contact of the rocker on the bracket 48 while preventing lateral movement of the rocker relative to the bracket, three support bands (a central and two outer bands 55 and 59, respectively) are employed, similar in many respects to the bands 31, 32 in Figs. 5 and 6.

The band 55 as may be seen clearly by reference to Figs. 23 and 25 is rectangular and secured at one end to the curved face of the central section or mid-arm 49 of the rocker by a pair of screws 55a passing through the mid-arm 49 and band 55 and threading into an anchor block 55b (see Figs. 20 and 25). The other end of band 55 is secured to the bracket 48 by a pair of screws 56 passing through a rectangular anchor block 55c on top of the band and threaded into tapped holes in the bracket 48 (see Figs. 20 and 25).

The provision of pairs of screws to secure each end of band 55 enables forces lateral to the beam to be better sustained. To prevent galling and chafing of the band 55, a cushion 58 preferably of rubber, is bonded to the band and interposed between the band and adjacent metal surfaces. Metal to metal contact is also avoided in the region of screws 55a and 56 by the interposition of cushions 57, preferably of some material such as a phenolic resin.

The outer support bands 59 are of L-shape, each having the end of one leg secured to the curved face of the rocker arms 50 and 51, respectively, by a screw 61 passing through the arm and its associated band and threading into an anchor block 59b. The opposite ends of the outer bands 59 are secured to the bracket by pairs of screws 60, 60', which pass through rectangular anchor block 59c and through the other leg of the L. The screw 60 then threads into a tapped hole in the bracket 48 while the screw 60' passes through the wear plate 54 and then into the bracket 48. Making the bands 59 L-shaped permits them to be secured to the bracket at one end by a pair of screws enabling lateral forces relative to the beam better to be sustained. The bending portions 64 of bands 59 lying between screws 60 and screw 61, are each approximately one-half as wide as central support band 55. The bands 59 have cushions 62 and 63 corresponding to those used in the central section 49.

It will be observed that in the arrangement described, the support bands 59 of the intermediate sections are attached to the rocker arms 50, 51, on one side of the rocker while the band 55 of the central section is attached to rocker arm 49 on the other side of the rocker assembly. Thus, when the assembly is rocked in one direction, the central band is bent inwardly and when the assembly is rocked in the other direction, the intermediate bands are bent inwardly. Thus, a balanced resistance to rolling movement is obtained.

In the construction described in Figs. 17-23, a practical embodiment of the invention is provided which has the advantage of avoiding excessive wear on the support bands. Thus, metal to metal rolling contact and the wear resulting therefrom is confined entirely to the outer sections of the rocker assemblies which may be constructed of materials particularly selected for their resistance to wear. The support bands located in the recessed central and intermediate sections and cushioned from galling and chafing metal contact, may be made of materials selected for their primary function, namely, to provide a resilient means joining the rocker assembly to the brackets.

Another arrangement of flexure links is shown in Fig. 10 where four flexure links are used to control the moving element. The flexure links in Fig. 10 are employed in two pairs, the pairs lying in parallel planes perpendicular to the direction of motion. In the arrangement of Fig. 10, the beams are fastened to the stationary element, and the rockers to the moving element.

Another variation is shown in Fig. 11, where two groups of three flexure links each are employed in two planes, the beams again being secured to the stationary element, and the rockers contacting the moving element. In the embodiment of Fig. 11, the flexure links in each plane are distributed symmetrically 120° apart.

Figure 12 shows an arrangement wherein two sets of four flexure links each are used, the links being arranged in two planes, the individual links in each plane being 90° apart.

Figure 13 shows a combination of flexure links using both the flexure link described in connection with Figs. 5 and 6, and that shown in Figs. 7 and 8. A link of the embodiment shown in Figs. 7 and 8 is rigidly attached to the moving element, and its rockers contact the stationary element. In another plane, four flexure links of the sort shown in Figs. 5 and 6, are employed and are rigidly connected to the stationary element, with the rockers contacting the table of the moving element 26, the contact surfaces being on lugs 25, provided on the sides of the driver table.

In Fig. 14, a rigid link is shown consisting of four flexures of the form illustrated in Fig. 4.

To sum up, the novel flexure links described in this application allow an element to be elastically linked to its support in such a fashion that relative motion of the element, with respect to its support, is possible in one direction, but prevented in any other direction. In the specific application dealt with in the specification, it will allow the moving element of a vibration exciter to move linearly in the direction of the exciting force, and will restrain motion in any other direction.

In addition, with certain forms of the novel flexure links it is possible to exploit fully the advantages of cantilever beams. It has been stated that certain cantilever beams, as such, are highly desirable for use in flexure links because of their intrinsic capacity for energy storage. However, to achieve this advantage, the beam must be rigidly fixed at one end, and hinged at the other. Because the novel flexure links are in effect hinged at at least one end, they permit full advantage to be taken of the cantilever construction. Thus it is possible to obtain stiffer supports, operable at higher frequencies, and larger deflections, while still staying within allowable working stresses.

Moreover, in vibration exciters using known types of flexure links, it has been necessary to allow for the slightly arcuate movement which such links impart to the moving element by making thte air gap (indicated as 37 in Fig. 1) in the magnetic field larger than necessary for clearance of the driver coil. Because the flexure links of the invention confine the movinng element to pure linear motion, this excessive width of the air gap is not necessary and a more efficient apparatus can be constructed.

The novel flexure links provide a further advantage over known constructions in which thin bands are subjected to severe and repeated flexure, in that the degree of flexure of all parts of the present links is relatively small, and in that the bending of the bands is controlled by the shape of the rocker, reducing the chance of breakage.

My structures have the further advantage that the bands used are always used under tension loads and that generally forces directed along the axis of the beam are taken out by the rocker rather than through the bands. This is in distinction to prior constructions wherein thin bands are subject to both tension and compression loads. Compression loads of this nature often result in buckling with its attending undesirably large bending stresses.

What I claim is:

1. In a vibration exciter, a fixed core means, movable driver means, and a plurality of flexure links connecting the said means, each of said flexure links comprising a beam and a rocker, the rocker being on one end of the beam and having rolling contact with one of said means, said flexure links being arranged in two planes perpendicular to the direction of movement of the driver means, flexure links in one plane in spaced positions about said driver means each moving in the same direction at the same time to insure linear movement of said driver means.

2. A suspension system as claimed in claim 1, wherein the rocker is formed as the arc of a circle having a radius approximately one-third the length of the flexure link.

3. A suspension system connecting a first member and a second member at least one of which is movable comprising a plurality of flexure links, said flexure links including a beam and rocker means, the rocker means being attached to at least one end of said beam, said rocker means having rolling contact with one of said members and the beam of each of said links being connected with the other member, said rocker means having a first section and a second section and including a resilient, flexible support band, said first section of the rocker means being in rolling contact with the one member, and said support band being fixed at one point to the one member and at another point to said second section of the rocker means and being substantially free from rolling contact with the one member whereby excessive wear on said support band is avoided.

4. A suspension system as claimed in claim 3, wherein the second section of the rocker means is recessed with respect to the first section, thereby permitting rolling contact between the support band and the one member to be eliminated.

5. A suspension system connecting a first member and a second member comprising a plurality of flexure links, said flexure links each including a flexible resilient beam and rocker means, the rocker means being attached to at least one end of said beam, said rocker means having rolling contact with one of said members and the beam of each of said links being connected with the other member, said beam being adapted to bend on movement of one member relative to the other member and said rocker means being curved to compensate for the foreshortening of the beam caused by its bending, whereby motion of one member relative to the other is permitted in one direction and motion in any other direction is prevented.

6. A suspension system connecting a first member and a second member comprising a plurality of flexure links, each of said links comprising a flexible resilient beam, rocker means, and a flexible resilient support band connecting said rocker to one of said members, said band being attached at one point to the said one member and at another point to the rocker, said rocker means being attached to one end of said beam, the other end of said beam being attached to the other member, whereby motion of said movable member relative to said fixed member is permitted in one direction, and motion in any other direction is prevented.

7. A suspension system connecting a first member and a second member, and having a plurality of flexure links extending unsupported between said first and second members, each of said links comprising a rigid beam and two rockers, one of said rockers being attached to each end of the beam, one of said rockers having rolling contact with said first member and the other having rolling contact with said second member, whereby motion of one member relative to the other member is permitted in one direction, and means to maintain said rockers in rolling non-slidable engagement with the members with which they contact.

8. A suspension system connecting a first member and a second member, said first member being located centrally of said second member and said system comprising a flexure link, said link comprising a beam and two rockers, said rockers being fixed to the ends of said beam, said beam being fixed to said first member, and said rockers being non-slidably connected to opposite sides of said second member, whereby motion of one member relative to the other member is permitted in one direction and motion in any other direction is prevented.

9. A suspension system as claimed in claim 8 wherein said flexure link is the sole means of support for said moving member.

10. A suspension system connecting a fixed and a movable member and having a plurality of flexure links, said links each comprising a beam and pinion rocker means attached to at least one end of said beam and connecting with at least one of said members, at least one of the said members having a rack adapted to engage said pinion rocker means, whereby motion of said movable member relative to said fixed member is permitted in one direction and motion in any other direction is prevented.

11. In a vibration exciter, a fixed outer member, a movable inner member, and a plurality of flexure links arranged in spaced positions about said inner member and connecting said members and adapted to insure linear movement of said inner member relative to said outer member, each of said flexure links comprising a beam fixed to one of said members and rocker means, said rocker means having rolling contact with the other member, the beams on opposite sides of said inner member and in approximately the same plane all moving in the same direction at the same time.

12. In a vibration exciter, apparatus as claimed in claim 11, wherein said rocker means comprises a first section and a second section and including a flexible, resilient support band, said first section of the rocker means being in rolling contact with the one member, and said support band being fixed at one point to the one member and at another point to said second section of the rocker means and being substantially free from rolling contact with said one member, whereby excessive wear on said support band is avoided.

13. In a vibration exciter, apparatus as claimed in claim 12, wherein said second section is recessed with respect to said first section, thereby permitting rolling contact between the support band and the one member to be eliminated.

14. In a vibration exciter, a fixed core, movable driver means, and a plurality of flexure links connecting said core and said driver means and adapted to insure linear movement of said driver means, each of said flexure links comprising a beam fixed to said core and rocker means having rolling contact with said driver means, said flexure links being arranged in two planes perpendicular to the direction of movement of said driver means.

15. In a vibration exciter, a fixed core, movable driver means, and a plurality of flexure links for insuring linear movement of said driver means relative to said core, said flexure links each comprising a beam and rocker means fixed to one end of said beam, said beam being fixed to said driver means, and said rocker means being connected with said core.

16. In a vibration exciter, apparatus as claimed in claim 15, in which the rocker is formed as the arc of a circle having a radius approximately one-third the length of the beam.

17. In a vibration exciter, apparatus as claimed in claim 15, in which there are six flexure links arranged in two planes perpendicular to the direction of movement of the driver means, there being three links in each plane, 120° apart.

18. In a vibration exciter, a fixed core, movable driver means and a plurality of flexure links for insuring linear movement of said driver means relative to said core, said flexure links each comprising a flexible, resilient beam fixedly connected to said driver means and rocker means having rolling contact with said core.

19. In a vibration exciter, apparatus as claimed in claim 18, having driver means in which there are four flexure links arranged in two planes perpendicular to the direction of movement of the driver means, there being two links in each plane, each link having rocker means fixed to the end of its beam.

20. In a vibration exciter, a fixed core, movable driver means, and eight flexure links for insuring linear movement of said driver means relative to said core, said flexure links each comprising a flexible, resilient beam and a rocker fixed to one end of said beam, said beam being fixed to said core, and said rocker having rolling contact with said driver means, said eight flexure links being mounted in two parallel planes perpendicular to the line of movement of said driver means, the flexure links in each plane being 90° apart.

21. In a vibration exciter, a fixed core, movable driver means, a table fixed to said driver means, and a flexure link for insuring linear movement of said table relative to said core, said flexure link comprising a flexible, resilient beam fixedly connected at its midpoint to said table and two rockers, said rockers being fixed to the ends of said beam and non-slidably connected to said core in rolling relation therewith.

22. In a vibration exciter, apparatus as claimed in claim 21, in which said core is provided with channels to receive said rockers.

23. In a vibration exciter, apparatus as claimed in claim 21, and including a plurality of additional flexure links arranged in a plane parallel to the plane of said flexure link, and a plurality of lugs on said table, said additional flexure links each comprising a beam fixed at one end to said core, and a rocker, fixed to the other end of said beam, and having rolling contact with said lugs.

24. In a vibration exciter, a fixed core, movable driver means, and a plurality of flexure links for insuring linear movement of said driver means relative to said core, said flexure links each comprising a rigid beam and two rockers, one at each end of said beam, one of said rockers contacting said core, and the other contacting said driver means.

25. Apparatus as claimed in claim 24, in which each rocker is formed as the arc of a circle having a radius one-half the length of the beam.

26. In a vibration exciter, fixed core means, movable driver means and a plurality of links connecting the said means, each of said links being rigid and having rocker means at each end, said rocker means having rolling contact with said core means and said driver means respectively, said links being arranged in two planes perpendicular to the direction of movement of said driver means, the links in one plane in spaced positions about said driver means each moving in the same direction at the same time to insure linear movement of said driver means.

27. A vibration exciter as claimed in claim 26 having means on each end of said links movably connecting said links to said driver means and to said core means respectively.

References Cited in the file of this patent

UNITED STATES PATENTS

| | | |
|---|---|---|
| 2,094,824 | Sanford | Oct. 5, 1937 |
| 2,487,029 | Piety | Nov. 1, 1949 |
| 2,651,735 | Wisman | Sept. 8, 1953 |
| 2,705,761 | Umholz | Apr. 5, 1955 |

FOREIGN PATENTS

| | | |
|---|---|---|
| 329,850 | Germany | Dec. 4, 1920 |